H. J. GROETKEN.
LOCK NUT.
APPLICATION FILED FEB. 11, 1918.

1,318,865.

Patented Oct. 14, 1919.

INVENTOR
H. J. GROETKEN

BY
Milton L. Crandall
ATTORNEY

UNITED STATES PATENT OFFICE.

HENRY J. GROETKEN, OF LE MARS, IOWA.

LOCK-NUT.

1,318,865.   Specification of Letters Patent.   Patented Oct. 14, 1919.

Application filed February 11, 1918. Serial No. 216,609.

*To all whom it may concern:*

Be it known that I, HENRY J. GROETKEN, a citizen of the United States, and a resident of Le Mars, in the county of Plymouth and State of Iowa, have invented certain new and useful Improvements in Lock-Nuts, of which the following is a specification.

This invention relates to lock-nuts.

The invention aims to provide an improved lock-nut inexpensive in manufacture, readily applied to and removed from a bolt and thoroughly dependable in use.

Another object of the invention is the production of a lock-nut which positively prevents relative rotation between the nut and bolt and yet does not injure the threads.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Although I have illustrated and hereinafter described the preferred embodiment of the invention, I would not be understood as being limited to the specific structure chosen for illustration, for various alterations and modifications in the details of construction and arrangement of parts may be made without departing from the spirit and scope of the invention as defined in the appended claims.

Referring now to the illustrations 6, is a bolt having threaded thereon a nut 7, having, adjacent one side of its bore, a notch, 8, the wall of which is inclined or tapered inwardly to receive an inclined or beveled stud, 9, on a washer 10, resting on said nut. Above the washer is a second nut, 11, which, when threaded upon the bolt and screwed into firm engagement with the washer, causes the stud 9, to coact with the beveled wall of the notches, to force the stud firmly against the bolt, thereby preventing relative rotation between the nuts and bolt.

Figure 2:
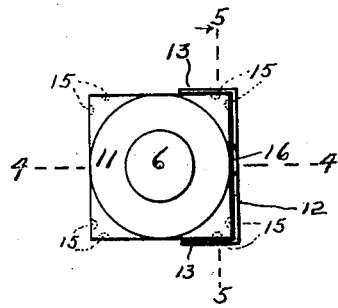
Fig. 2 is a plan of the same.
Figure 3:
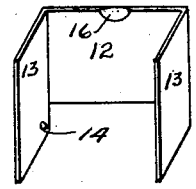
Fig. 3 is a perspective view of the nut-locking clip.
Figure 1:
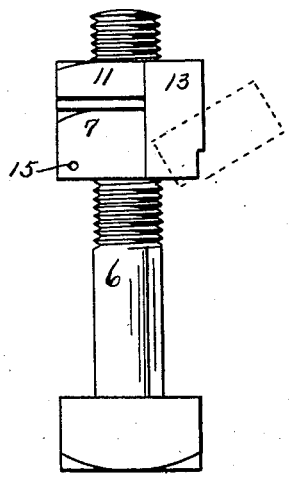
Figure 1 is an elevation of the preferred embodiment of the invention, as applied to a bolt.
Figure 4:
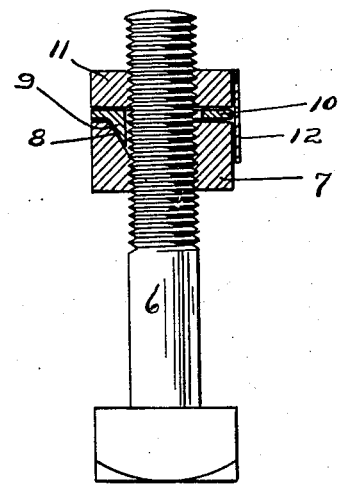
Fig. 4 is a vertical section, taken on the line 4—4 of Fig. 2.
Figure 5:
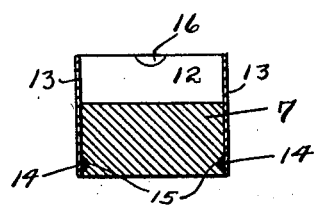
Fig. 5 is a vertical section of the lower nut and clip taken on the line 5—5 of Fig. 2.

In application the nut 11, is turned until its sides are parallel with the sides of the companion nut, in which position the nuts are retained, preferably by means of a spring clip, consisting of a plate, 12, normally embracing corresponding sides of the nuts and provided on opposite edges with flanges 13, which tend to spring inwardly and firmly engage the adjacent sides of the nuts. The clip is preferably pivoted on the lower nut to spring outwardly, as shown in dotted lines in Fig. 1 to permit removal of the nut 11, for this purpose, the flanges 13, are formed on their inner sides with studs 14, adapted to be received in recesses, 15, in the nut 7. Obviously, the clip may be sprung into position on the nuts after the latter have been tightened. The nut 7, is preferably provided on all sides with the recesses 15, whereby the clip may be placed on any side of the nut which is most convenient. Adjacent its upper edge the web, 12, of the clip is provided with a notch 16, to receive the finger nail, or a pointed instrument, for forcing the clip from the nuts.

Having thus described my invention, what I claim is new, and desire to secure by Letters Patent of the United States, is,—

1. A nut-lock comprising two flat sided nuts adapted to be screwed onto a bolt, a washer adapted to be interposed between the nuts, a tapered stud on the face of the washer, one of the nuts having a tapered recess to receive the stud and so positioned that the stud will be forced against the bolt when the other nut is tightened against the washer, and a clip for preventing relative rotation between the nuts and including a clip provided with flanges pivoted to opposite sides of one of the nuts to swing toward and from the other nut, and engageable with the sides of the latter nut.

2. A lock for two flat-sided nuts adapted to be screwed onto a bolt, said lock comprising a clip provided with flanges adapted to engage opposite corresponding sides of the nuts, to prevent their relative rotation, said flanges being pivoted to one of the nuts whereby the lock may be swung toward and from the other nut.

3. A lock for two nuts adapted to be screwed onto a bolt, said lock comprising a clip of yieldable material having flanges adapted to yieldably impinge opposite corresponding sides of the nuts, one of the nuts being provided with recesses on its sides, and the flanges being provided with studs to enter the recesses whereby the lock may be removably pivoted on one of the nuts to swing toward and from the other nut.

In testimony whereof I have hereunto set my hand this 3rd day of December, 1917.

HENRY J. GROETKEN.